(12) United States Patent
Garcia

(10) Patent No.: US 8,555,781 B1
(45) Date of Patent: Oct. 15, 2013

(54) GARBAGE PROCESSING RECYCLER

(76) Inventor: Wilfredo Garcia, Mansfield, TX (US)

(*) Notice: Subject to any disclaimer, the term of this patent is extended or adjusted under 35 U.S.C. 154(b) by 367 days.

(21) Appl. No.: 13/109,089

(22) Filed: May 17, 2011

(51) Int. Cl.
*B30B 1/00* (2006.01)
*B02C 17/02* (2006.01)

(52) U.S. Cl.
USPC ........ 100/223; 100/229 A; 100/230; 100/237; 100/98 R; 241/95

(58) Field of Classification Search
USPC ........ 241/95; 100/223, 222, 221, 225, 229 A, 100/23, 237
See application file for complete search history.

(56) References Cited

U.S. PATENT DOCUMENTS

| | | | | |
|---|---|---|---|---|
| 628,663 A | * | 7/1899 | Hysoar | 100/99 |
| 719,032 A | * | 1/1903 | Napier | 99/495 |
| 3,685,438 A | | 8/1972 | Ziegler | |
| 3,831,513 A | * | 8/1974 | Tashman | 100/52 |
| 3,916,782 A | * | 11/1975 | Booton | 100/229 A |
| 4,201,347 A | * | 5/1980 | Elkin | 241/92 |
| 4,241,652 A | * | 12/1980 | Smedlund | 100/49 |
| 5,123,341 A | | 6/1992 | Carter et al. | |
| 5,129,318 A | * | 7/1992 | Zimmer | 100/352 |
| 5,221,052 A | * | 6/1993 | Vega | 241/36 |
| 5,257,577 A | | 11/1993 | Clark | |
| 5,259,304 A | | 11/1993 | Roberts | |
| 5,423,492 A | | 6/1995 | Willis | |
| D396,049 S | | 7/1998 | Chadwick | |
| 5,813,323 A | | 9/1998 | Nowak | |
| 7,318,558 B2 | * | 1/2008 | Canegallo | 241/95 |

* cited by examiner

*Primary Examiner* — Faye Francis
(74) *Attorney, Agent, or Firm* — Kyle Fletcher

(57) ABSTRACT

The garbage processing recycler includes a series of top compartments aligned above a series of bottom compartments. A hydraulic cylinder is concentrically aligned with the top compartments to provide a compressor function attributed with opposing compressor plates that can descend into opposing top compartments to compress recyclable materials contained therein. After compression, a support base is removed and the recyclables are shredded upon passing through a screen via the same hydraulic cylinder and compressor plate, and thereafter the compressed and shredded recyclable material descends below to the respective bottom compartment.

20 Claims, 5 Drawing Sheets

GARBAGE PROCESSING RECYCLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of recycling, more specifically, a garbage processing unit that organizes and compresses recyclables.

B. Discussion of the Prior Art

As a preliminary note, it should be stated that there is an ample amount of prior art that deals with recycling. As will be discussed immediately below, no prior art discloses a recycling organizer and compressor comprised of a series of top compartments aligned above a series of bottom compartments; wherein a hydraulic cylinder is concentrically aligned with the top compartments to provide a compressor function attributed with opposing compressor plates that can descend into opposing top compartments to compress recyclable materials contained therein; where after a support base is removed and the recyclables are compressed and shredded upon passing through a screen via the same hydraulic cylinder and compressor plate, and there after the compressed and shredded recyclable material descends below to the respective bottom compartment, and thereafter the compressed recyclables is removed from the bottom compartment; wherein the entire apparatus includes caster wheels that mobilize the apparatus.

The Roberts patent (U.S. Pat. No. 5,259,304) discloses a carousel compactor for selectively sorting and recycling multi-component refuse. However, the carousel compactor does not compact and shred recyclables when transferring from a top compartment to a bottom compartment.

The Carter et al. patent (U.S. Pat. No. 5,123,341) discloses a solid waste compactor having multiple receptacles. However, the waste compactor does not sort, compact, and shred.

The Ziegler patent (U.S. Pat. No. 3,685,438) discloses a refuse compactor device which consists of a hydraulic cylinder and ram. Again, the compactor device does not include a top compartment and corresponding bottom compartment, and between which recyclables and/or refuse is compressed and shredded.

The Willis patent (U.S. Pat. No. 5,423,492) discloses a device for recycling glass containers comprising a rotatable carousel having a plurality of glass receiving receptacles. However, the device is directed to recycling glass and not other recycleables or refuse.

The Nowak patent (U.S. Pat. No. 5,813,323) discloses a multiple bin solid waste compacting device. However, the compacting device does not sort or shred recyclables or refuse.

The Clark patent (U.S. Pat. No. 5,257,577) discloses a carousel device, which collects recyclable refuse material in separate compartments. However, the device does not sort, compress, and shred the various recyclables.

While the above-described devices fulfill their respective and particular objects and requirements, they do not describe a recycling organizer and compressor comprised of a series of top compartments aligned above a series of bottom compartments; wherein a hydraulic cylinder is concentrically aligned with the top compartments to provide a compressor function attributed with opposing compressor plates that can descend into opposing top compartments to compress recyclable materials contained therein; where after a support base is removed and the recyclables are compressed and shredded upon passing through a screen via the same hydraulic cylinder and compressor plate, and there after the compressed and shredded recyclable material descends below to the respective bottom compartment, and thereafter the compressed recyclables is removed from the bottom compartment; wherein the entire apparatus includes caster wheels that mobilize the apparatus. In this regard, the garbage processing recycler departs from the conventional concepts and designs of the prior art.

SUMMARY OF THE INVENTION

The garbage processing recycler includes a series of top compartments aligned above a series of bottom compartments. A hydraulic cylinder is concentrically aligned with the top compartments to provide a compressor function attributed with opposing compressor plates that can descend into opposing top compartments to compress recyclable materials contained therein. After compression, a support base is removed and the recyclables are shredded upon passing through a screen via the same hydraulic cylinder and compressor plate, and thereafter the compressed and shredded recyclable material descends below to the respective bottom compartment.

An object of the invention is to provide a garbage processing recycler that sorts garbage into recyclables and garbage and thereafter compresses and/or shreds the sorted items.

A further object of the invention is to provide a garbage processing recycler that uses a series of top compartments aligned above a series of bottom compartments such that upon sorting/compressing/shredding, the items fall below into the respective bottom compartment.

A further object of the invention is to provide a screen mesh that shreds glass, paper, and plastic upon compression of said items across said screen mesh.

These together with additional objects, features and advantages of the garbage processing recycler will be readily apparent to those of ordinary skill in the art upon reading the following detailed description of presently preferred, but nonetheless illustrative, embodiments of the garbage processing recycler when taken in conjunction with the accompanying drawings.

In this respect, before explaining the current embodiments of the garbage processing recycler in detail, it is to be understood that the garbage processing recycler is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the garbage processing recycler.

It is therefore important that the claims be regarded as including such equivalent construction insofar as they do not depart from the spirit and scope of the garbage processing recycler. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE EMBODIMENT

Figure 1:
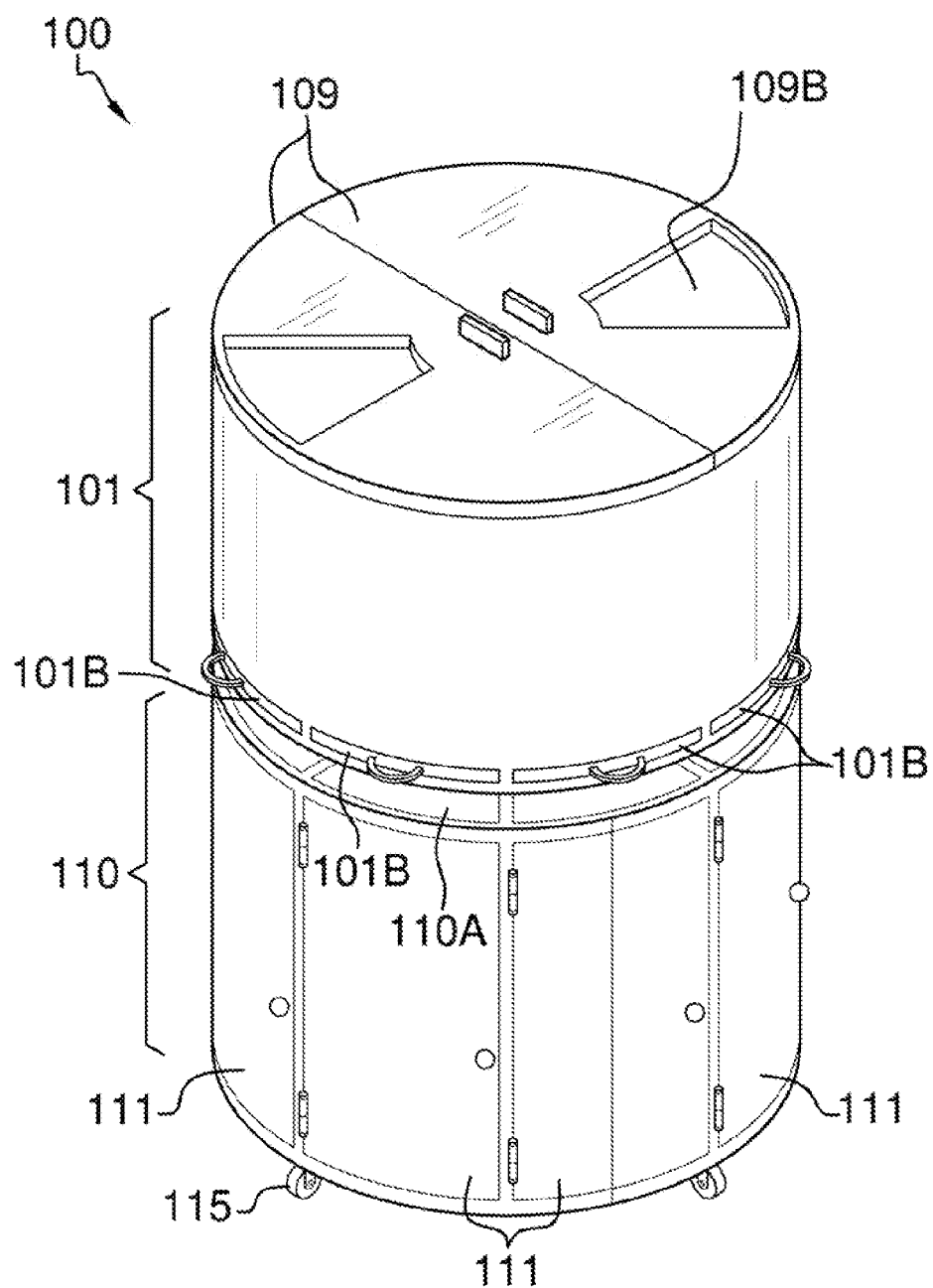
FIG. 1 illustrates an isometric view of the garbage processing recycler in which the lids cover the top compartments.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A garbage processing recycler 100 (hereinafter invention) includes a series of top compartments 101 that form a cylinder in shape such that each top compartment 101 is a wedge of a pie. The top compartments 101 each include a vertical slot 102 that is located on an inner side 101A.

Each top compartment 101 includes a support base 103 that slides in and out of a support slot 101B located along the periphery of the top compartment 101.

The inner side 101A of each top compartment 101 form an inner circle 101C into which a hydraulic arm 104 is located, and of which extends and retracts within. Compressor plates 105 extend from compressor arms 105A atop the hydraulic arm 104. The compressor plates 105 and the compressor arms 105A are diametrically opposed such that the hydraulic arm 104 compresses materials 130 located within two top compartments 101 that are opposite of one another.

The hydraulic arm 104 is controlled via a hydraulic compressor 104A that is located beneath the hydraulic arm 104.

Figure 5:
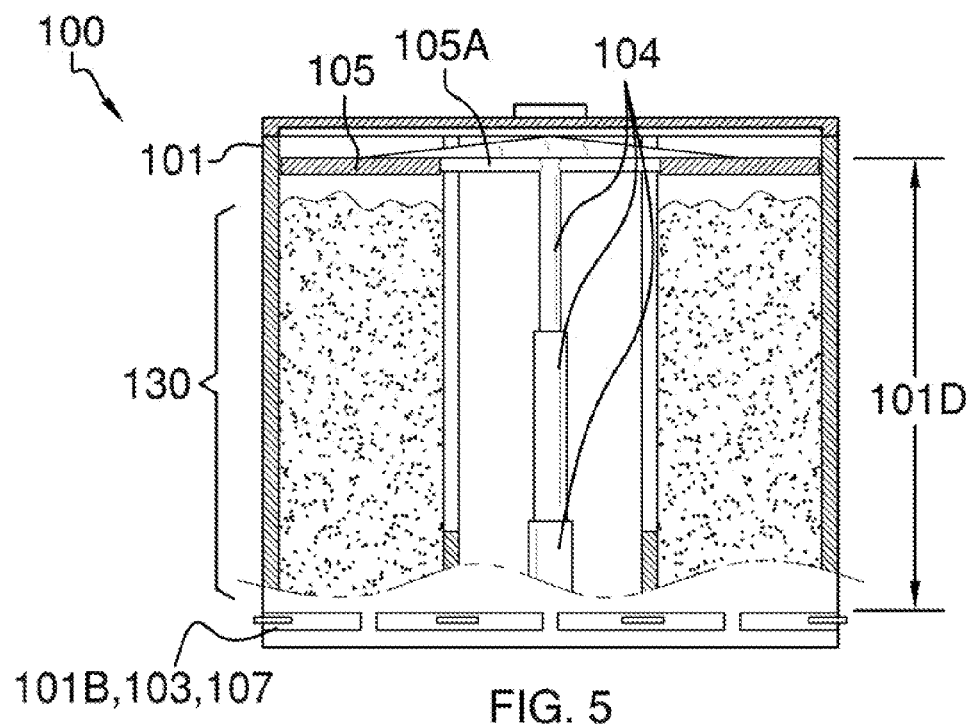
FIG. 5 illustrates a detail view of two opposing top compartments filled with recyclable or garbage material that has not been compressed.
Figure 6:
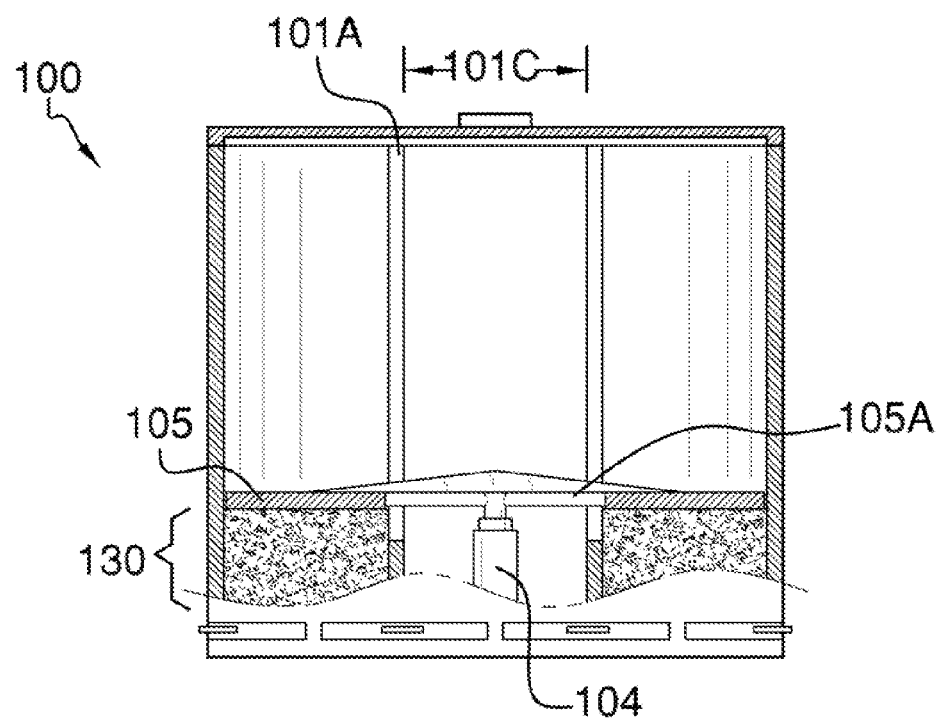
FIG. 6 illustrates a detail view of two opposing top compartments in which the compressor plates have been descended and thus compressed the contents of the two respective top compartments.

The vertical slots 102 located in each top compartment 101 enable the compressor arms 105A to travel a length 101D of the top compartment 101 in order to compress the materials 130 located within (see FIGS. 5-6). The support base 103 located at a bottom end of each top compartment 101 is used to insure that the materials 130 located within the respective compartment 101 are compressed therein. Once, the materials 130 are compressed via the compressor plates 105, the support base 103 may be removed, and the materials 130 may descend into bottom compartments 110 located below.

Figure 2:
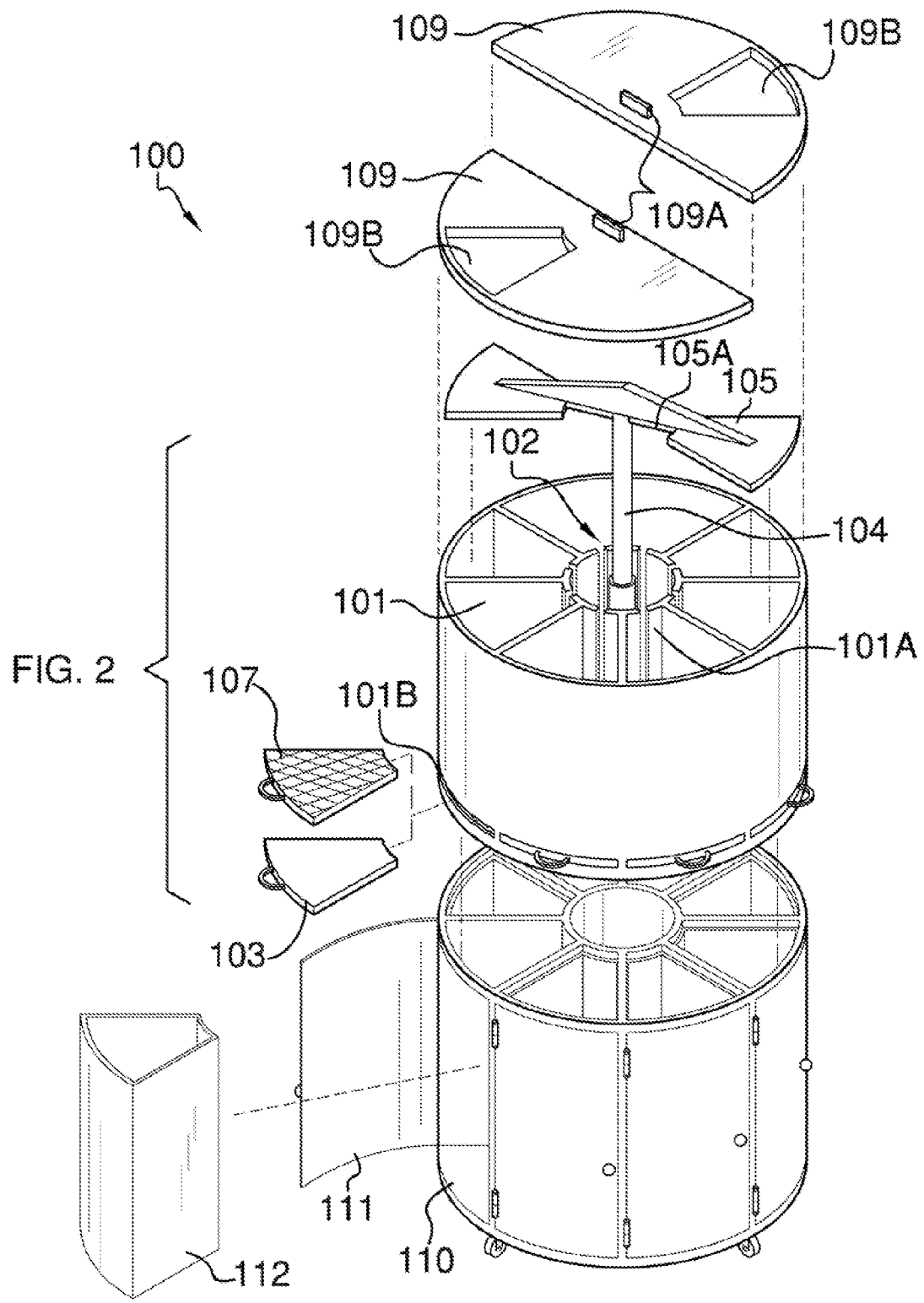
FIG. 2 illustrates an exploded view of the garbage processing recycler in which the lids are removed from the top compartments and the hydraulic cylinder and two compressor plates are fully extended above the top compartments; wherein a support base is removed from a support base slot.
Figure 3:
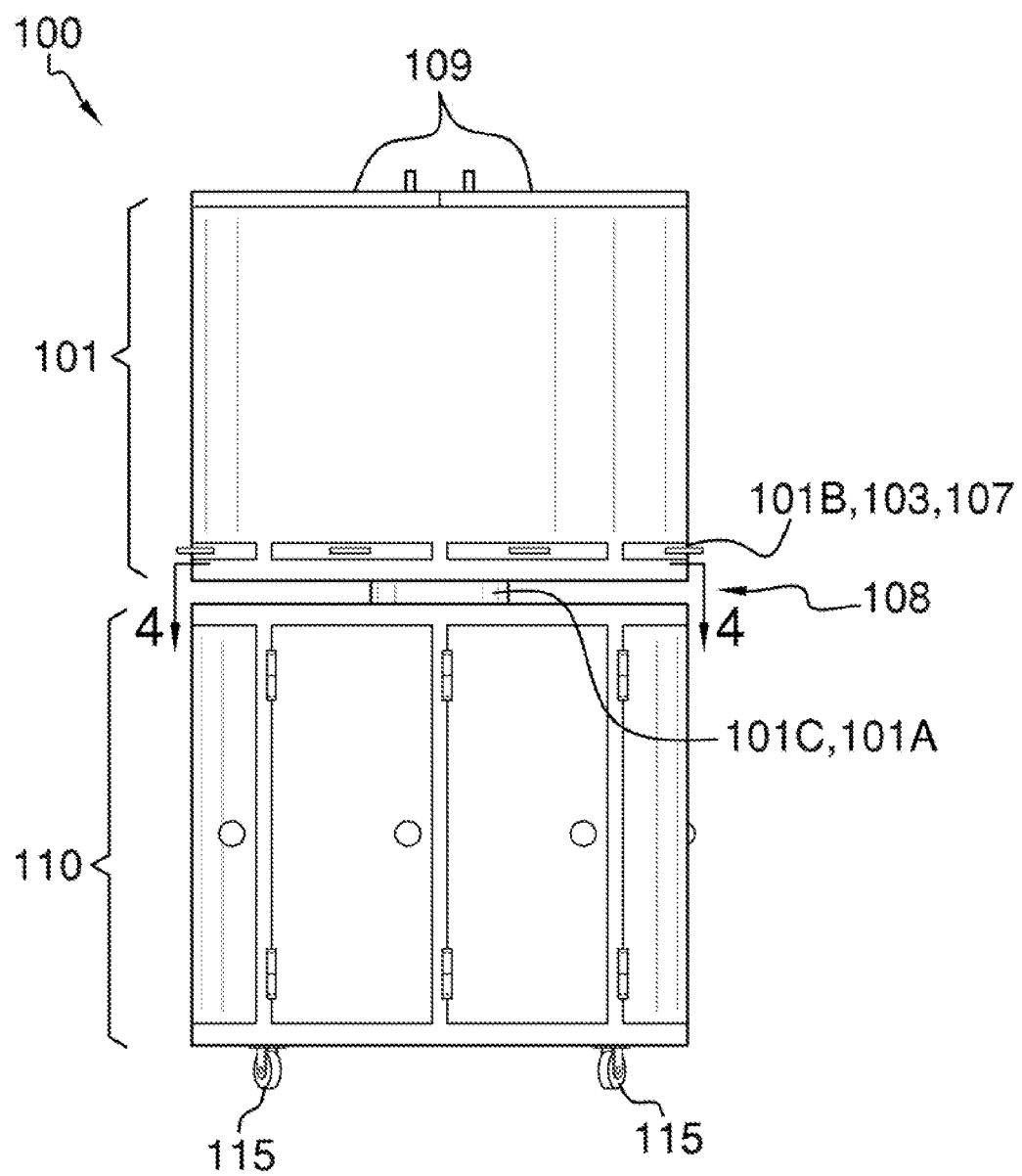
FIG. 3 illustrates a side view of the garbage processing recycler and detailing the bottom compartments and respective doors enabling access thereto and depicting the support base slots located at a bottom of the top compartments.
Figure 4:
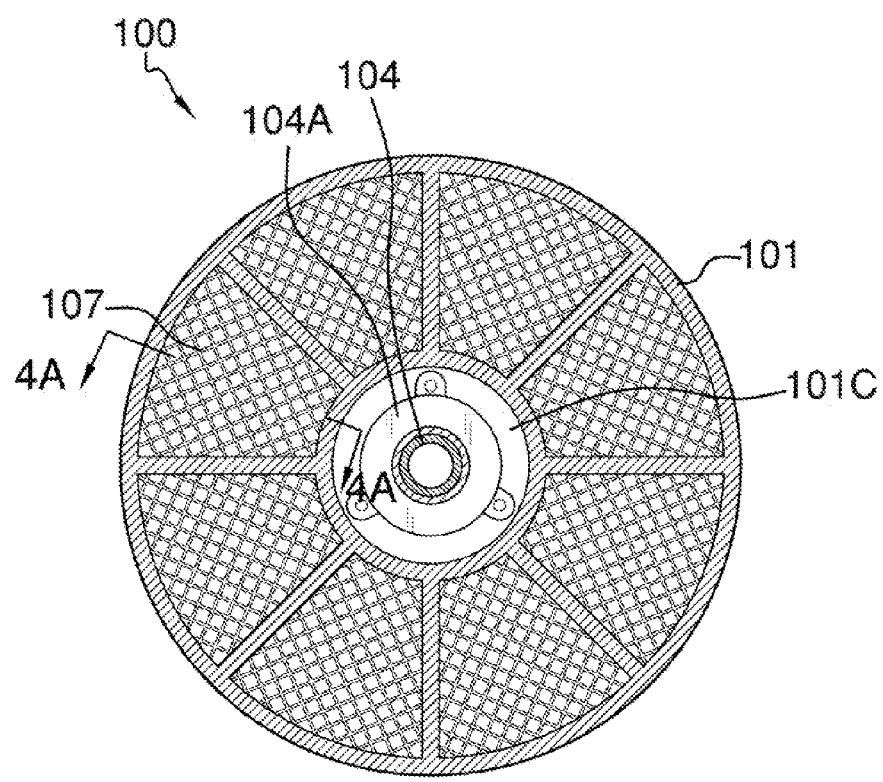
FIG. 4 illustrates a cross-sectional view of the garbage processing recycler along line 4-4 in FIG. 3, and depicting the hydraulic cylinder and respective top compartments as well as the screen mesh located within all applicable support slots as a replacement to the support bases.
Figure 4A:
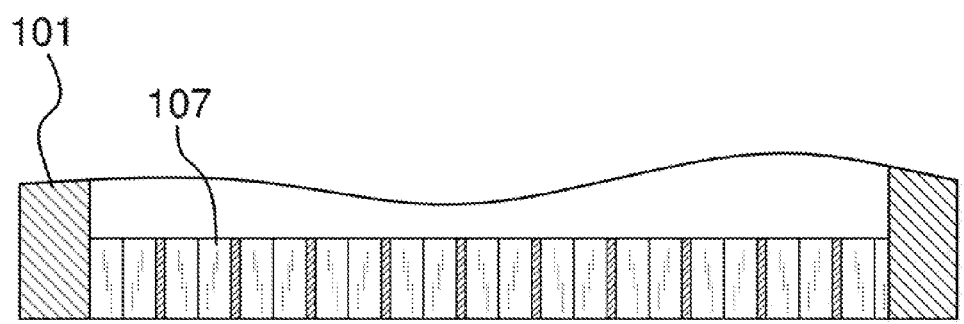
FIG. 4A illustrates a cross-sectional view of the garbage processing recycler along line 4A-4A in FIG. 4, and depicting the screen mesh that is located within the support slot.

As mentioned earlier, the support base 103 may be removed from the respective support 101B, and upon removal may be replaced with a screen mesh 107 (see FIG. 2). The screen mesh 107 is used to shred materials 130 either during or after compression via the compressor plates 105. The screen mesh 107 will shred materials compressed there through to sized defined by the screen mesh 107. However, it shall be noted that the use of the screen mesh 107 is dependent upon the type of material 130 being collected within the top compartment 101. For example, it may not be necessary to shred glass or aluminum cans, but it may be necessary to shred paper and plastic objects.

The bottom compartments 110 are located beneath the top compartments 101, and also form a cylinder in shape in which each bottom compartment 110 has a wedge shape. Materials 130 that have been compressed via the compressed plates 105, and may fall into a respective bottom compartment 110 where after a door 111 may be open to pull out a collection bin 112. The collection bin 112 is used to collect the materials 130 and pull out the collected materials 130 there from. It shall be noted that the collection bin 112 may include a trash bag liner to further simplify the process. The bottom compartments 110 and respective collection bins 112 aid the process of the invention 100 after sorting and compression and/or shredding have transpired. That being said, the bottom compartments 110 and the respective top compartments 101 can be individually assigned for specific uses pertaining to particular types of recyclables comprising: paper, plastic, glass, aluminum cans, remaining garbage.

A gap 108 exists between the top compartments 101 and the bottom compartments 110. The gap 108 enables the materials that have been compressed and/or shredded to free-fall from the screen mesh 107 into the bottom compartment 110 aligned below. The inner circle 101C spans across the gap 108, and is responsible for securing the top compartments 101 atop the bottom compartments 110. The materials 130 descending from the top compartment 101 passes across the gap 108 before entering a bottom opening 110A of the respective bottom compartment 110.

Located atop the top compartments 101 are two covers 109 that include handles 109A to aid in lifting and lowering the covers 109 over the top compartments 101. The covers 109 are included to seal off the contents of the top compartments 101, which may attract wildlife and emit unpleasant odors.

The covers 109 may include openings 109B that are in the shape of one of the top compartments 101 situated below. The openings 109B enable access to the corresponding top compartment 101, which may be desirable to provide access where the compressor plates 105 are not in use.

Caster wheels 115 are located under the bottom compartments 110, and enable the invention 100 to be mobilized. The top compartments 101, the bottom compartments 110, the compressor plates 105, the compressor arms 105A shall be made of materials comprising plastic, metal, wood, or carbon fiber composite.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the ant will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A garbage processing recycler, comprising:
   a series of top compartments aligned above a series of bottom compartments;
   wherein each top compartment has an inner side that includes a vertical slot through which a compressor arm can traverse;
   wherein a hydraulic arm attaches to at least one compressor arm, which is attached to a compressor plate that can descend into the top compartment to compress materials located therein;
   wherein a support base slides in and out of a support slot located near a bottom of the top compartment, and when inserted insures that said materials are compressed via the compressor plates.

2. The garbage processing recycler as described in claim 1 wherein the hydraulic arm has two compressor arms that extend in opposing directions such that the compressor plates attached thereto can compress materials located in opposing top compartments.

3. The garbage processing recycler as described in claim 1 wherein a gap exists between the top compartments and the bottom compartments such that the compressed materials free-fall down from the top compartment and into a bottom opening of the respective bottom compartment.

4. The garbage processing recycler as described in claim 3 wherein the inner sides form an inner circle that traverses a length of the top compartment, across the gap, and the bottom compartments.

5. The garbage processing recycler as described in claim 1 wherein the top compartments and the bottom compartments are each wedge shaped and form a pie.

6. The garbage processing recycler as described in claim 1 wherein the hydraulic arm is controlled by a hydraulic compressor.

7. The garbage processing recycler as described in claim 1 wherein a screen mesh is provided for each of the top compartment and upon removal of the support base can slide in to replace the support base; wherein the screen mesh is used to shred materials either during or after compression via the compressor plates.

8. The garbage processing recycler as described in claim 1 wherein each bottom compartment includes a door that opens to expose the interior of the bottom compartment, and of which a collection bin is located and of which collects materials after compression.

9. The garbage processing recycler as described in claim 1 wherein at least one cover includes a handle to aid in lifting and lowering the cover over the top compartments.

10. The garbage processing recycler as described in claim 9 wherein the covers each have an opening in the shape of one of the top compartments such that the top compartment aligned there under is accessible when the cover is in place.

11. The garbage processing recycler as described in claim 1 wherein caster wheels located under the bottom compartments, enable mobilization of the garbage processing recycler.

12. A garbage processing recycler, comprising:
    a series of top compartments aligned above a series of bottom compartment's;
    wherein the top compartments and the bottom compartments are each wedge shaped and form a pie;
    wherein each top compartment has an inner side that includes a vertical slot through which a compressor arm can traverse;
    wherein a hydraulic arm attaches to at least one compressor arm, which is attached to a compressor plate that can descend into the top compartment to compress materials located therein;
    wherein a support base slides in and out of a support slot located near a bottom of the top compartment, and when inserted insures that said materials are compressed via the compressor plates;
    wherein at least one cover includes a handle to aid in lifting and lowering the cover over the top compartments;
    wherein the hydraulic arm has two compressor arms that extend in opposing directions such that the compressor plates attached thereto can compress materials located in opposing top compartments;
    wherein a gap exists between the top compartments and the bottom compartments such that the compressed materials free-fall down from the top compartment and into a bottom opening of the respective bottom compartment.

13. The garbage processing recycler as described in claim 12 wherein the inner sides form an inner circle that traverses a length of the top compartment, across the gap, and the bottom compartments.

14. The garbage processing recycler as described in claim 12 wherein the hydraulic arm is controlled by a hydraulic compressor.

15. The garbage processing recycler as described in claim 12 wherein a screen mesh is provided for each of the top compartment and upon removal of the support base can slide in to replace the support base; wherein the screen mesh is used to shred materials either during or after compression via the compressor plates.

16. The garbage processing recycler as described in claim 12 wherein each bottom compartment includes a door that opens to expose the interior of the bottom compartment, and of which a collection bin is located and of which collects materials after compression.

17. The garbage processing recycler as described in claim 12 wherein caster wheels located under the bottom compartments, enable mobilization of the garbage processing recycler.

18. A garbage processing recycler, comprising:

a series of top compartments aligned above a series of bottom compartments;

wherein the top compartments and the bottom compartments are each wedge shaped and form a pie;

wherein each top compartment has an inner side that includes a vertical slot through which a compressor arm can traverse;

wherein a hydraulic arm attaches to at least one compressor arm, which is attached to a compressor plate that can descend into the top compartment to compress materials located therein;

wherein a support base slides in and out of a support slot located near a bottom of the top compartment, and when inserted insures that said materials are compressed via the compressor plates;

wherein at least one cover includes a handle to aid in lifting and lowering the cover over the top compartments;

wherein the hydraulic arm has two compressor arms that extend in opposing directions such that the compressor plates attached thereto can compress materials located in opposing top compartments;

wherein a gap exists between the top compartments and the bottom compartments such that the compressed materials free-fall down from the top compartment and into a bottom opening of the respective bottom compartment;

wherein each bottom compartment includes a door that opens to expose the interior of the bottom compartment, and of which a collection bin is located and of which collects materials after compression;

wherein the inner sides form an inner circle that traverses a length of the top compartment, across the gap, and the bottom compartments;

wherein the hydraulic arm is controlled by a hydraulic compressor.

19. The garbage processing recycler as described in claim 18 wherein a screen mesh is provided for each of the top compartment and upon removal of the support base can slide in to replace the support base; wherein the screen mesh is used to shred materials either during or after compression via the compressor plates.

20. The garbage processing recycler as described in claim 18 wherein caster wheels located under the bottom compartments.

* * * * *